US011773759B1

(12) United States Patent
Nukada et al.

(10) Patent No.: US 11,773,759 B1
(45) Date of Patent: Oct. 3, 2023

(54) OIL PASSAGEWAY STRUCTURE FOR INTERNAL COMBUSTION ENGINES

(71) Applicant: HONDA MOTOR CO., LTD., Tokyo (JP)

(72) Inventors: Yoshitaka Nukada, Tokyo (JP); Hitoshi Yokotani, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/120,516

(22) Filed: Mar. 13, 2023

(30) Foreign Application Priority Data

Mar. 31, 2022 (JP) .................................. 2022-059879

(51) Int. Cl.
*F01M 11/02* (2006.01)
*F01P 5/12* (2006.01)

(52) U.S. Cl.
CPC ................ *F01M 11/02* (2013.01); *F01P 5/12* (2013.01); *F01M 2011/021* (2013.01)

(58) Field of Classification Search
CPC .............................. F01M 2011/021; F01P 5/12
USPC .................................... 123/41.47, 195 C, 599
See application file for complete search history.

(56) References Cited

U.S. PATENT DOCUMENTS

| | | | | |
|---|---|---|---|---|
| 4,643,135 A | * | 2/1987 | Wunsche | F04D 13/064 |
| | | | | 123/41.47 |
| 5,159,901 A | * | 11/1992 | Chonan | F01P 5/12 |
| | | | | 123/41.47 |
| 8,307,804 B2 | | 11/2012 | Ohta | |
| 2002/0043412 A1 | * | 4/2002 | Fukuda | F01P 5/12 |
| | | | | 180/68.1 |
| 2012/0073527 A1 | * | 3/2012 | Oltmans | F01P 5/12 |
| | | | | 123/41.47 |
| 2012/0073537 A1 | * | 3/2012 | Oltmans | F02F 1/40 |
| | | | | 123/195 R |

FOREIGN PATENT DOCUMENTS

JP     2010-065630 A    3/2010

* cited by examiner

*Primary Examiner* — Erick R Solis
(74) *Attorney, Agent, or Firm* — Carrier, Shende & Associates P.C.; Joseph P. Carrier; Fulchand P. Shende

(57) ABSTRACT

An oil passageway structure for IC engines includes a generator provided on one end side of a crankshaft, a generator cover that covers the generator and is fixed to an engine crankcase, a protective cover provided outside the generator cover and a water pump attached to an outer surface of the protective cover and having a drive shaft coaxially connected to one end of the crankshaft. The generator cover includes oil passageways that supply engine oil from the crankcase to the generator, and a generator cover-side guide portion that flows out engine oil collected from a generator housing space housing the generator toward the protective cover, and the protective cover includes a protective cover-side guide portion that guides and supplies the engine oil flowing out from the generator cover-side guide portion to the drive shaft of the water pump.

6 Claims, 10 Drawing Sheets

OIL PASSAGEWAY STRUCTURE FOR INTERNAL COMBUSTION ENGINES

TECHNICAL FIELD

The present invention relates to an oil passageway structure for internal combustion engines, and more particularly to an oil passageway structure for internal combustion engines in which a generator and a water pump are concentrically connected to a crankshaft.

BACKGROUND ART

For example, Patent Literature 1 below discloses a structure in which an oil reservoir is provided inside a magnet cover of a generator to cool the generator.

However, when the generator and a water pump are concentrically connected to a crankshaft in the internal combustion engine as in Patent Literature 1, in a case where engine oil is supplied to the crankshaft and the water pump in parallel, it is necessary to increase a supply amount of the engine oil. When the oil supply amount by an oil pump increases, the oil pump is enlarged, and the engine may be enlarged with an increase in cost.

PRIOR ART DOCUMENT

Patent Document

Patent Document 1: JP 2010-065630 A (FIG. 5)

SUMMARY OF THE INVENTION

[Underlying Problems to be Solved by the Invention]

The present invention has been made in view of such a prior art, and an object thereof is to provide an oil passageway structure for internal combustion engines capable of efficiently supplying engine oil to a generator and a water pump for cooling the generator and lubricating the water pump even when the generator and the water pump are concentrically connected to a crankshaft of the internal combustion engine.

Means to Solve the Problems

In order to solve the above problems, according to the present invention, there is provided an oil passageway structure for internal combustion engines, the oil passageway structure being used for an internal combustion engine including:

a crankcase that supports a crankshaft;

a generator that is provided on one end side of the crankshaft and generates power by rotation of the crankshaft;

a generator cover that covers the generator and is fixed to the crankcase, and a protective cover that is separate from the generator cover and is fixed to an outer side of the generator cover so as to overlap the generator cover as viewed in a crankshaft direction, in which a water pump is attached to an outer surface of the protective cover, and a drive shaft of the water pump is coaxially connected to one end of the crankshaft, and the generator cover includes oil passageways through which engine oil is supplied from the crankcase and is supplied to the generator, and a generator cover-side guide portion through which the engine oil collected from a generator housing space on a side housing the generator flows out toward a protective cover side, and the protective cover includes a protective cover-side guide portion that guides and supplies the engine oil flowing out of the generator cover-side guide portion to the drive shaft of the water pump.

According to the above configuration,

In a case where the engine oil is supplied from the crankcase to the generator and the water pump, there is a risk of an increase in an oil supply amount as the engine oil is branched and supplied. However, according to the present configuration, after the engine oil is supplied to the generator without branching the engine oil, the engine oil is collected and supplied to the drive shaft of the water pump, so that the engine oil supply amount can be suppressed. In addition, since the engine oil can be supplied to the generator prior to the water pump to cool the generator, the cooling of the generator can be improved, an amount of power generated by the generator can increase, and an oil seal of the drive shaft of the water pump can be lubricated without any problem.

According to a preferred embodiment of the invention, the generator cover-side guide portion includes an oil receiving portion that receives the engine oil adhering to an inner surface of the generator cover on the generator housing space side above an axis of the crankshaft, and an oil outlet portion that extends from the oil receiving portion toward the protective cover and opens.

Since the generator includes a rotor that rotates together with the crankshaft, the engine oil that has been supplied to the generator and has cooled the generator can be collected on the inner surface of the generator cover by a centrifugal force, and the collected engine oil drips to the oil receiving portion of the generator cover-side guide portion and is led out from the oil outlet portion to the outside of the generator cover, and can be guided and supplied to the drive shaft of the water pump by the protective cover-side guide portion. Therefore, the supply of the engine oil to the water pump can be secured, and the engine oil is less likely to be accumulated in the generator housing space of the generator cover.

According to a preferred embodiment of the invention, a radial guide rib extending upward from the generator cover-side guide portion is provided on an inner surface of the generator housing space of the generator cover.

Therefore, the engine oil adhering to and collected on the inner surface of the generator housing space of the generator cover by the centrifugal force can be actively guided to the generator cover-side guide portion by the guide rib, and the supply of the engine oil to the water pump can be more reliably performed.

According to a preferred embodiment of the invention, an engine oil supply portion to the drive shaft of the water pump is surrounded by a breather chamber defined between the generator cover and the protective cover, and the engine oil flowing out from the water pump passes through the breather chamber, passes through an oil return port provided in a lower portion of the breather chamber, and returns to an oil pan of the internal combustion engine.

Therefore, the engine oil liquefied in the breather chamber from a blow-by gas generated in a crank chamber and the engine oil supplied to the drive shaft of the water pump, then flowed out from the water pump, and flowed down in the breather chamber can be collected and returned to the oil pan, so that the engine oil can be efficiently circulated. The engine oil supplied to the water pump comes into contact with the blow-by gas in the breather chamber to promote gas-liquid separation of the blow-by gas.

Effects of the Invention

According to the oil passageway structure for internal combustion engines of the present invention, in a case where the engine oil is supplied from the crankcase to the generator and the water pump, there is a risk of an increase in an oil supply amount as the engine oil is branched and supplied. However, according to the present configuration, after the engine oil is supplied to the generator without branching the engine oil, the engine oil is collected and supplied to the drive shaft of the water pump, so that the engine oil supply amount can be suppressed. In addition, since the engine oil can be supplied to the generator prior to the water pump to cool the generator, the cooling of the generator can be improved, the amount of power generated by the generator can increase, and the oil seal of the drive shaft of the water pump can be lubricated without any problem.

MODE FOR CARRYING OUT THE INVENTION

Figure 1:
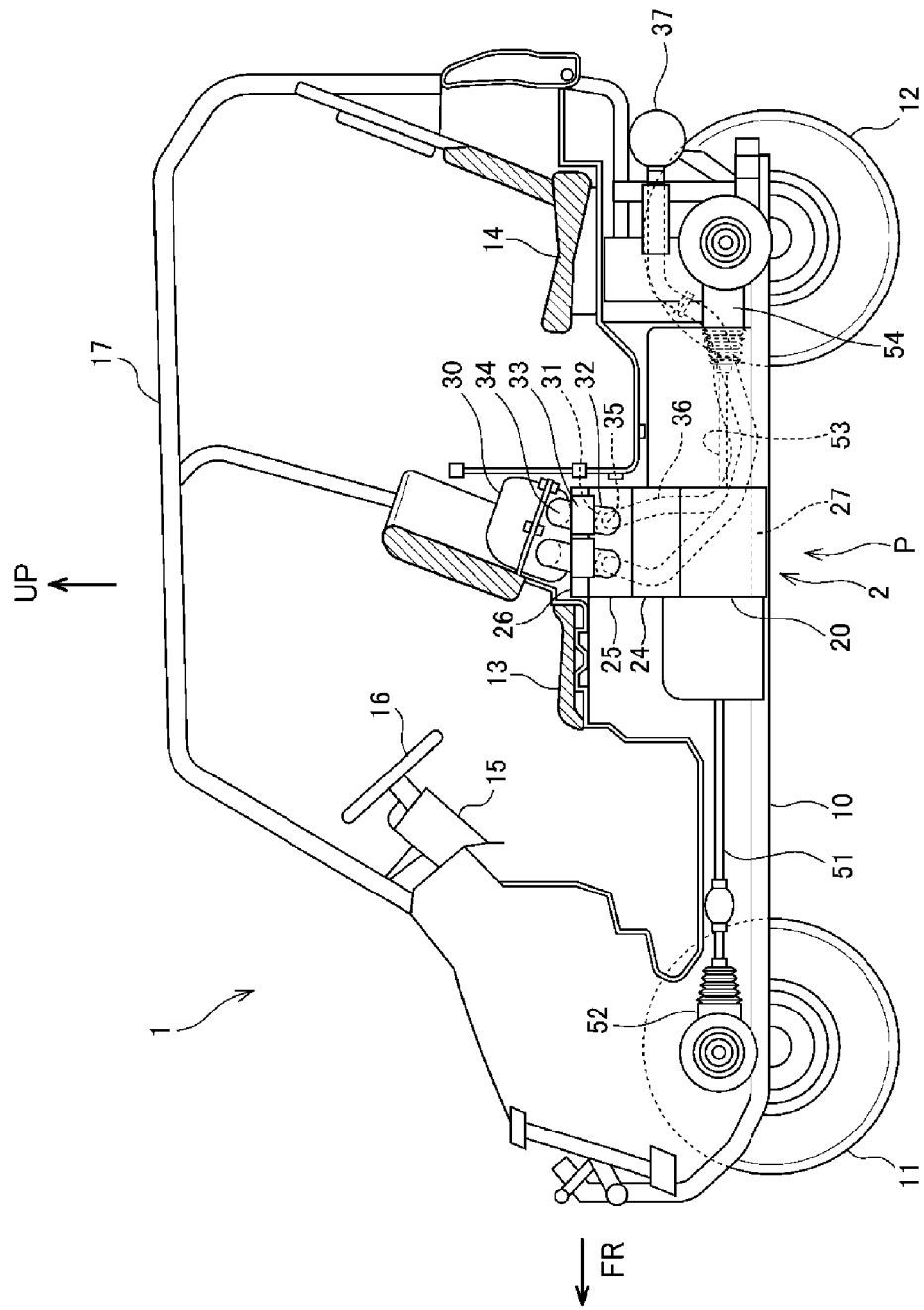
FIG. 1 is a schematic view of a left surface as a partial cross section of a vehicle for traveling on an uneven ground.

Hereinafter, an oil passageway structure for internal combustion engines according to one embodiment of the present invention will be described with reference to FIGS. 1 to 10.

Note that directions such as front, rear, left, right, up, and down in the description of the present specification and claims follow the direction of the vehicle in a state where the power unit including the oil passageway structure for internal combustion engines according to the present embodiment is mounted on the vehicle.

In addition, an arrow FR in the drawing indicates the front of the vehicle, LH indicates the left of the vehicle, RH indicates the right of the vehicle, and UP indicates the top of the vehicle.

In the present embodiment, the "vehicle" is a vehicle for traveling on an uneven ground such as a multi-utility vehicle (MUV).

As schematically illustrated in FIG. 1, the power unit P according to the present embodiment is mounted on a roof-equipped five-passenger uneven ground traveling vehicle 1 that can drive four wheels.

As an outline of a left surface is illustrated as a partial cross section in FIG. 1, in the vehicle 1 for traveling on an uneven ground, a pair of left and right front wheels 11 and a pair of left and right rear wheels 12 on which a low-pressure balloon tire for an uneven ground is mounted are suspended in front of and behind a vehicle body frame 10.

The power unit P is mounted at a front-rear center position of the vehicle body frame 10 with a crankshaft 21 (see FIGS. 2 to 4) of the internal combustion engine 2 directed in a front-rear direction, and an output shaft 5 (see FIGS. 2 to 4) of the power unit P parallel to the crankshaft 21 protrudes forward and backward.

The rotational power of the output shaft 5 is transmitted from a front end of the output shaft 5 to the left and right front wheels 11 via a front drive shaft 51 and a front final reduction gear unit 52, and is transmitted from a rear end to the left and right rear wheels 12 via a rear drive shaft 53 and a rear final reduction gear unit 54.

The front final reduction gear unit 52 incorporates a clutch that switches between two-wheel drive and four-wheel drive by connecting and disconnecting power transmission to the front wheels.

An air cleaner box is provided in an upper portion of the power unit P, and three front seats 13 are arranged side by side on the left and right so as to cover an upper portion of the air cleaner box 30, and two rear seats 14 are arranged on the left and right at a rear portion of the vehicle body frame 10.

The center seat of the front seat 13 is positioned higher than the left and right seats and slightly protrudes forward from the left and right seats, and the air cleaner box 30 is positioned at a lower rear portion thereof.

In the present embodiment, a driver's seat is the left front seat 13, and a steering wheel 16 is provided to protrude forward from a steering column 15.

A roof 17 covers an upper portion of the front seat 13 and the rear seat 14.

Figure 2:
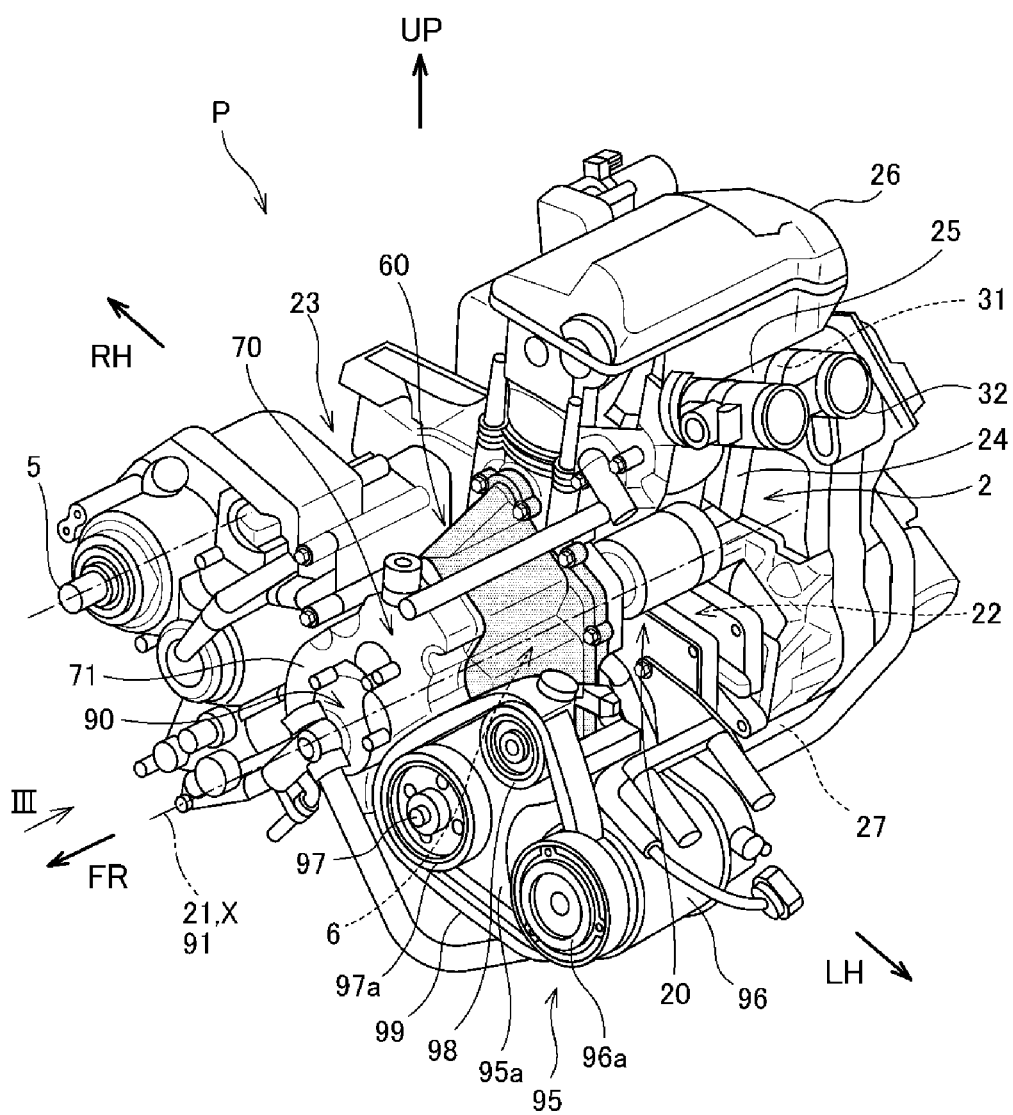
FIG. 2 is a left front perspective view of a power unit P.

As illustrated in FIG. 1 and FIG. 2 which is a left front perspective view of the power unit P, the power unit P mounted on the vehicle 1 for traveling on an uneven ground is mounted on the vehicle body frame 10 in a so-called longitudinal posture in which an axis X of the crankshaft 21 of the internal combustion engine 2 is directed in the front-rear direction of the vehicle body.

The power unit P includes a water-cooled four-stroke cycle internal combustion engine 2 having two parallel cylinders, and a main transmission 22 having a transmission shaft parallel to the crankshaft 21 in a crankcase 20 thereof, and an auxiliary transmission 23 having a transmission shaft parallel to the crankshaft 21 is connected to the main transmission 22 and assembled on the front right side thereof. The output shaft 5 of the auxiliary transmission 23 is the output shaft 5 of the power unit P oriented in the front-rear direction of the vehicle.

In the power unit P, a cylinder block 24 is provided in the upper portion of the crankcase 20 pivotally supporting the crankshaft 21 of the internal combustion engine 2, a cylinder head 25 and a cylinder head cover 26 sequentially overlap and protrude above the cylinder block 24, and the air cleaner box 30 is further provided above the cylinder head 25 and the cylinder head cover 26.

An oil pan 27 is provided in a lower portion of the crankcase 20, and stores engine oil to be fed into the internal combustion engine 2 and receives the engine oil flowing down and dripping in the crankcase 20.

An intake port 31 of each cylinder opens on a left surface of the cylinder head 25, and is connected to the air cleaner box 30 via an intake pipe 32, a throttle body 33, and a connecting tube 34.

An exhaust port 35 of each cylinder opens on a right surface of the cylinder head 25, and an exhaust pipe 36 is connected thereto. The exhaust pipe 36 is disposed so as to extend in a vehicle width direction along a rear edge of the vehicle body frame 10, and is connected to an exhaust muffler 37 supported by the vehicle body frame 10.

Figure 3:
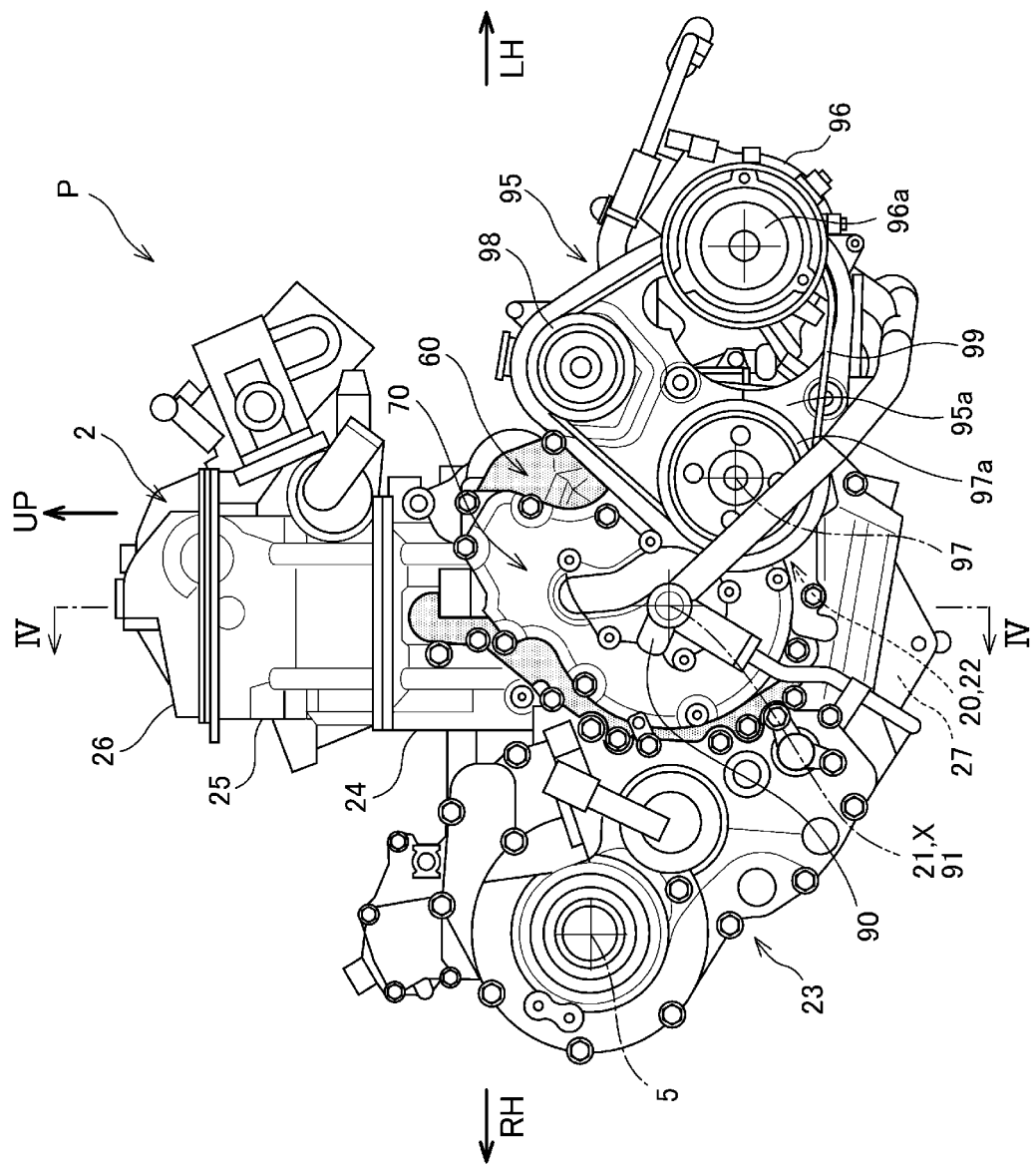
FIG. 3 is a front view of the power unit as viewed in a direction of an arrow III in FIG. 2.

FIG. 3 is a front view of the power unit as viewed in a direction of an arrow III in FIG. 2.

Figure 4:
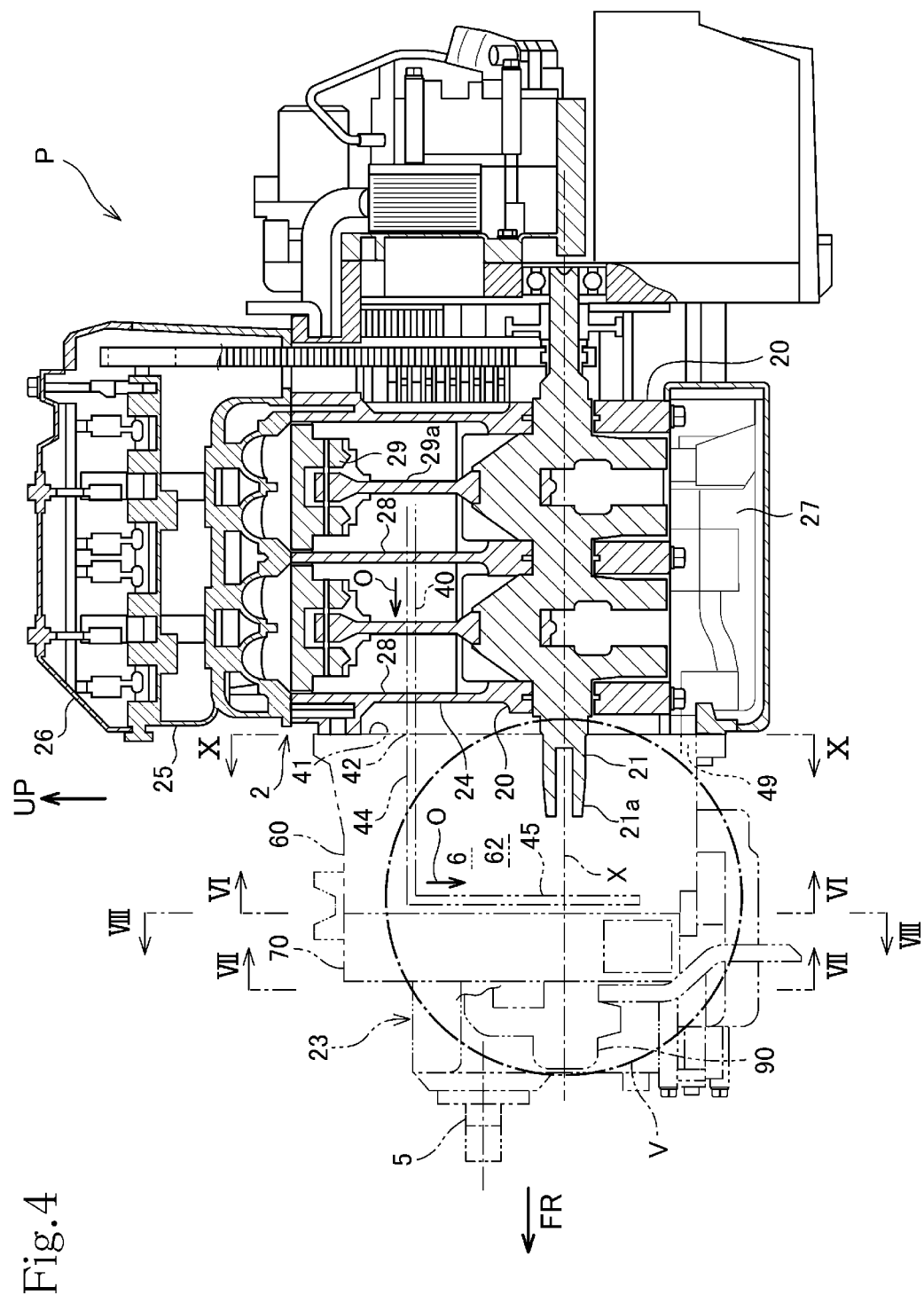
FIG. 4 is a left cross-sectional view of the power unit taken along line IV in FIG. 3, and schematically illustrates a front side of a crankcase by two-dot chain lines.

FIG. 4 is a left cross-sectional view of the power unit taken along line IV in FIG. 3, and schematically illustrates a front side of a crankcase by two-dot chain lines.

Figure 5:
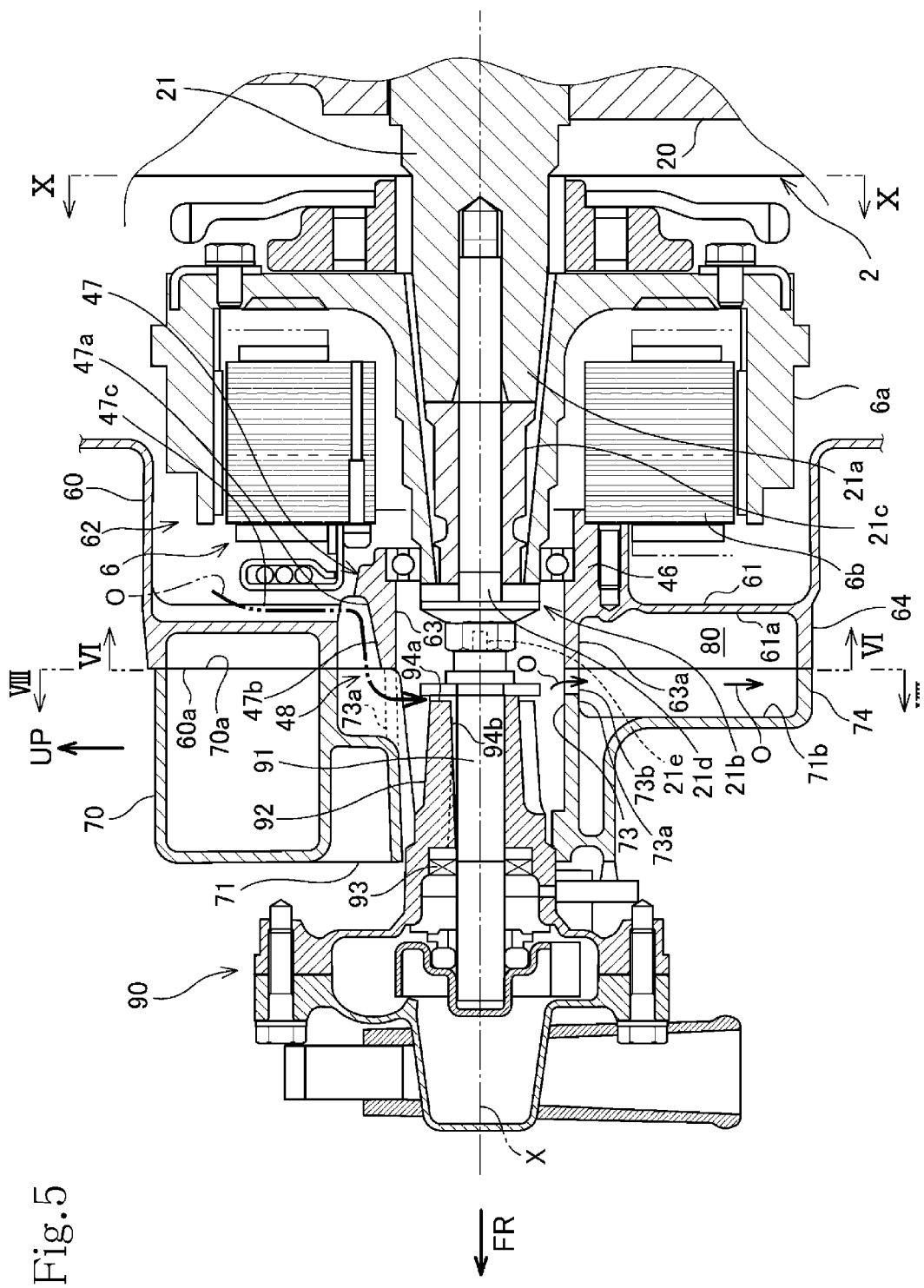
FIG. 5 is a detailed cross-sectional view of approximately a range V in FIG. 4.

FIG. 5 is a detailed cross-sectional view of a substantially range V in FIG. 4.

An arrow O in FIGS. 4 and 5 schematically indicates the flow of the engine oil according to the present invention.

As illustrated in FIGS. 2 and 4, in the crankshaft 21, the axis X is disposed in the front-rear direction, and a piston 29 of a cylinder bore 28 of two cylinders is connected by a connecting rod 29a. On the front end ("one end" in the present invention) 21a side of the crankshaft 21 penetrating the crankcase 20 forward, a generator 6 (see FIGS. 2, 4, 5, and 9) that generates power by rotation of the crankshaft 21 is attached and covered with a generator cover 60.

The generator cover 60 is attached to the front surface of the crankcase 20 on the front end 21a side of the crankshaft 21, and includes a generator housing space 62 (see FIGS. 5 and 6) that surrounds the generator 6 and closes the front side with a partition bottom 61.

The partition bottom 61 has a crankshaft center opening 63 (see FIGS. 5 and 6) which is open around the axis X on the front end 21a side of the crankshaft 21 and through which a connection member 21b concentrically connected to the crankshaft 21, a member of the generator 6 fixed by the connection member, a drive shaft 91 of a water pump 90 concentrically connected to the connection member 21b, and the like are inserted.

In the present embodiment, the connection member 21b is a bolt 21d concentrically screwed into the front end 21a of the crankshaft 21 via a shaft extension member 21c, and the bolt 21d concentrically fixes an outer rotor 6a of the generator 6 and includes a slot 21e on a bolt head, and has a structure in which the shaft end of the drive shaft 91 of the water pump 90 is engaged to connect and drive the water pump 90.

Note that an inner stator 6b of the generator 6 attached to the inner side of the generator cover 60 is inserted and positioned inside the bowl-shaped outer rotor 6a fixed to the front end 21a of the crankshaft 21, and the generator 6 is configured and provided at the front end 21a of the crankshaft 21 in the generator housing space 62.

In the generator cover 60, a protective cover 70 separate from the generator cover 60 is provided outside in the direction of the front end 21a of the crankshaft 21 so as to overlap with each other as viewed in the crankshaft direction, and mating surfaces 60a and 70a (see FIGS. 6, 8, and 9) of outer peripheral walls 64 and 74 of the generator cover 60 and the protective cover 70 are butted and fastened and fixed.

In FIGS. 2 and 3, the generator cover 60 is illustrated with dot hatching for easy identification.

Figure 7:
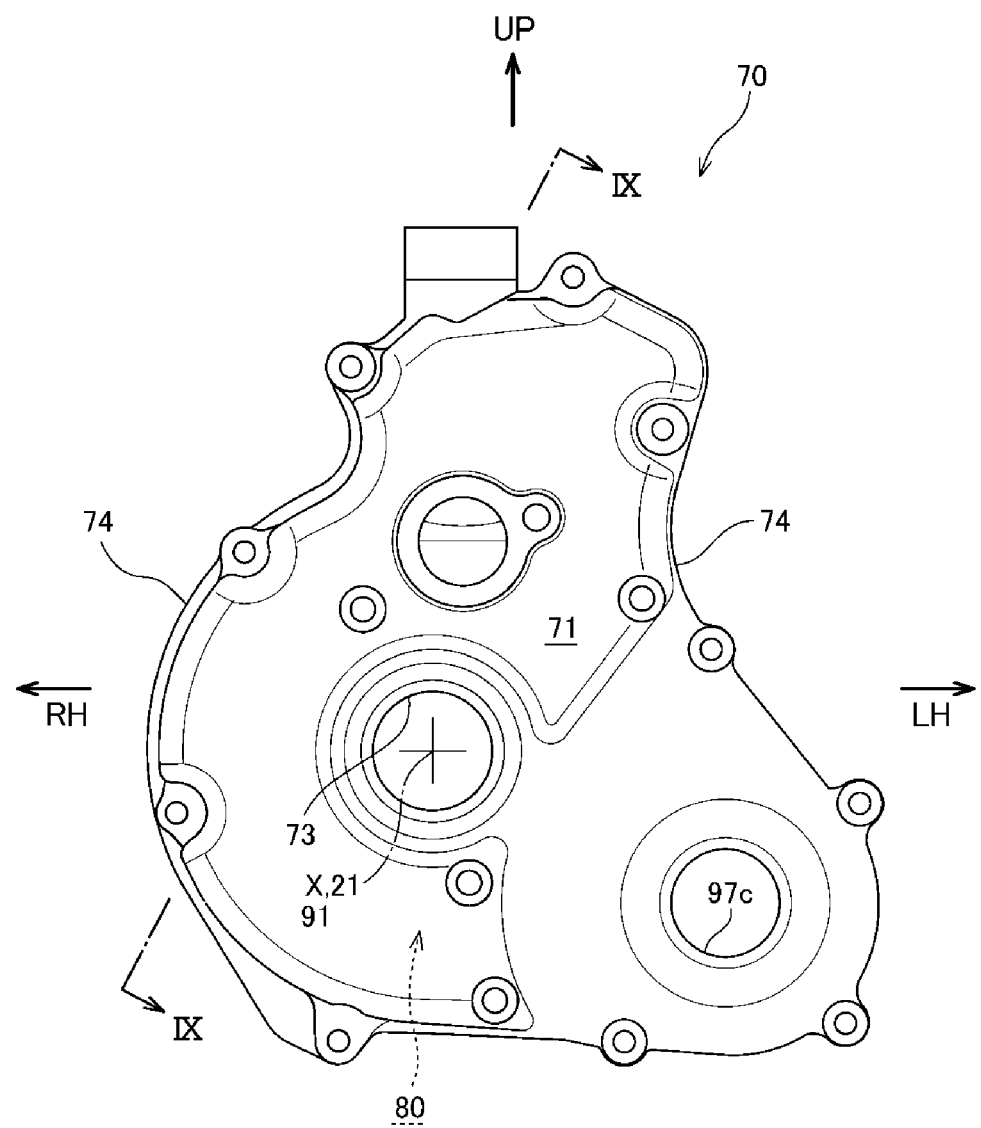
FIG. 7 is a front view of the protective cover as viewed in the crankshaft direction, taken along line VII-VII in FIG. 4.

FIG. 7 illustrates a front surface of the protective cover 70 as viewed in the crankshaft direction, taken along line VII-VII in FIG. 4.

The front portion of the protective cover 70 is closed by a top wall 71, but the top wall 71 has a crankshaft center opening 73 (see FIGS. 5, 7, and 8) which is opened around the axis X on the front end 21a side of the crankshaft 21 and into which the drive shaft 91 of the water pump 90 concentrically connected to the crankshaft 21 and a drive shaft boss 92 thereof are inserted.

As illustrated in FIGS. 2 to 5, the water pump 90 for cooling water is disposed and attached outside the protective cover 70 such that the drive shaft 91 of the water pump 90 is concentric with the front end 21a of the crankshaft 21, and is driven by the crankshaft 21.

In FIGS. 2 and 3, an air conditioner compressor device 95 is disposed on the left side (right side in the drawing) of the generator cover 60 and the protective cover 70.

A compressor 96 of the air conditioner compressor device 95 is rotationally driven by a belt 99 wound around a driving pulley 97a of a compressor drive shaft 97 rotationally driven by rotary power of the crankshaft 21, a driven pulley 96a on a shaft of the compressor 96, and a tensioner pulley 98, whereas a periphery of the belt 99 is surrounded by a cover portion 95a.

Although the cover portion 95a of the air conditioner compressor device 95 is separated from the protective cover in the present embodiment, the cover portion may be integrated with the protective cover 70.

Figure 6:
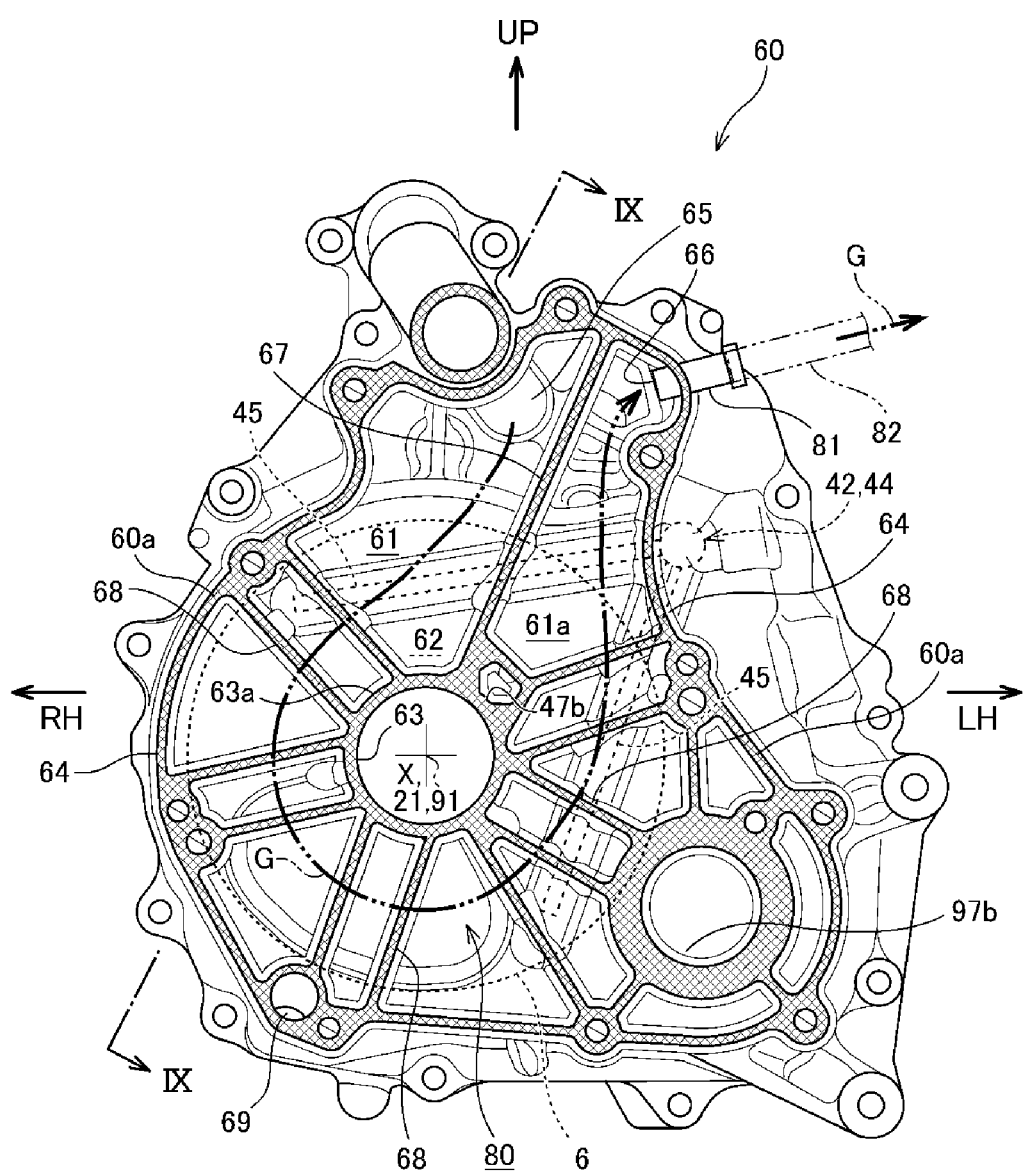
FIG. 6 is a front view of a generator cover as viewed in a crankshaft direction, taken along line VI-VI in FIGS. 4 and 5, and illustrates a surface on a breather chamber side.
Figure 8:
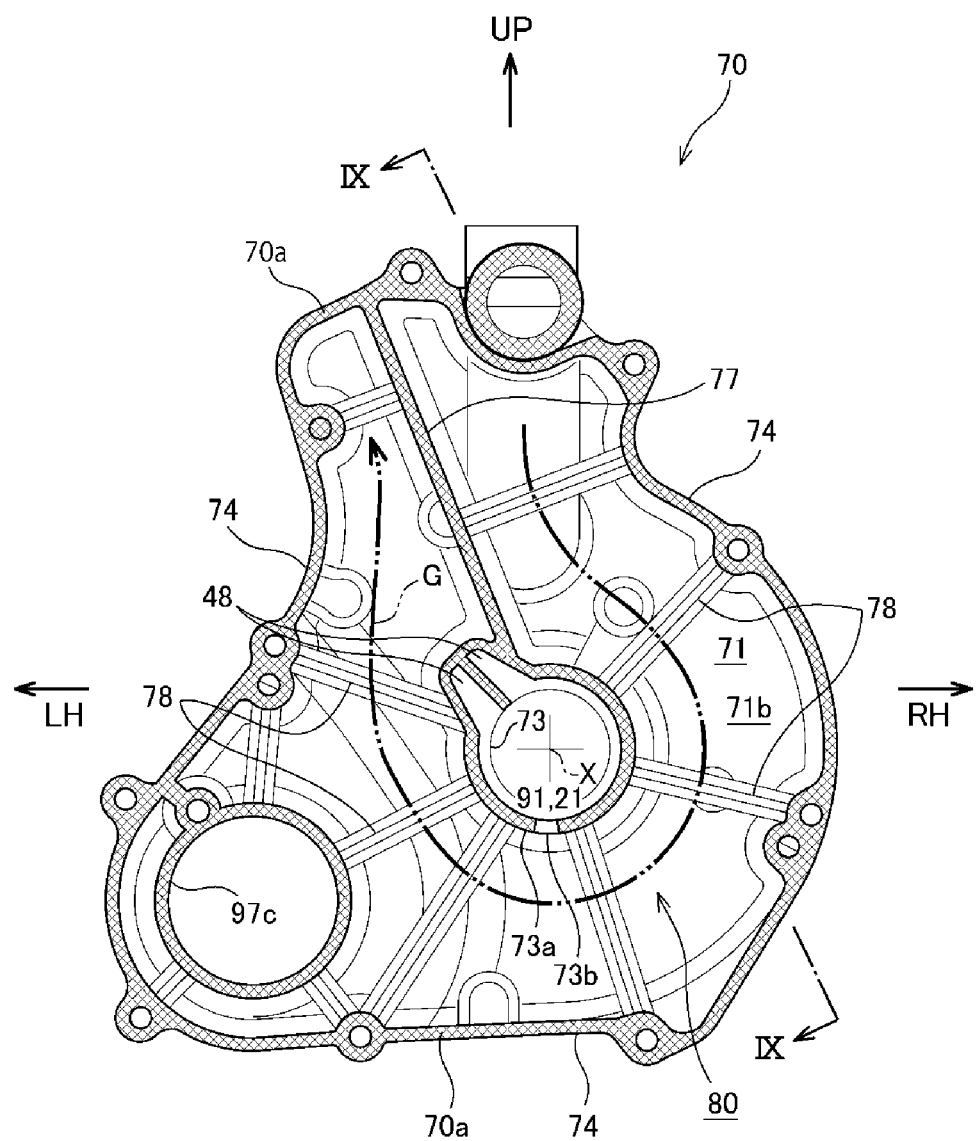
FIG. 8 is a rear view of the protective cover as viewed in the crankshaft direction, taken along line VIII-VIII in FIGS. 4 and 5, and illustrates a surface on the breather chamber side.
Figure 9:
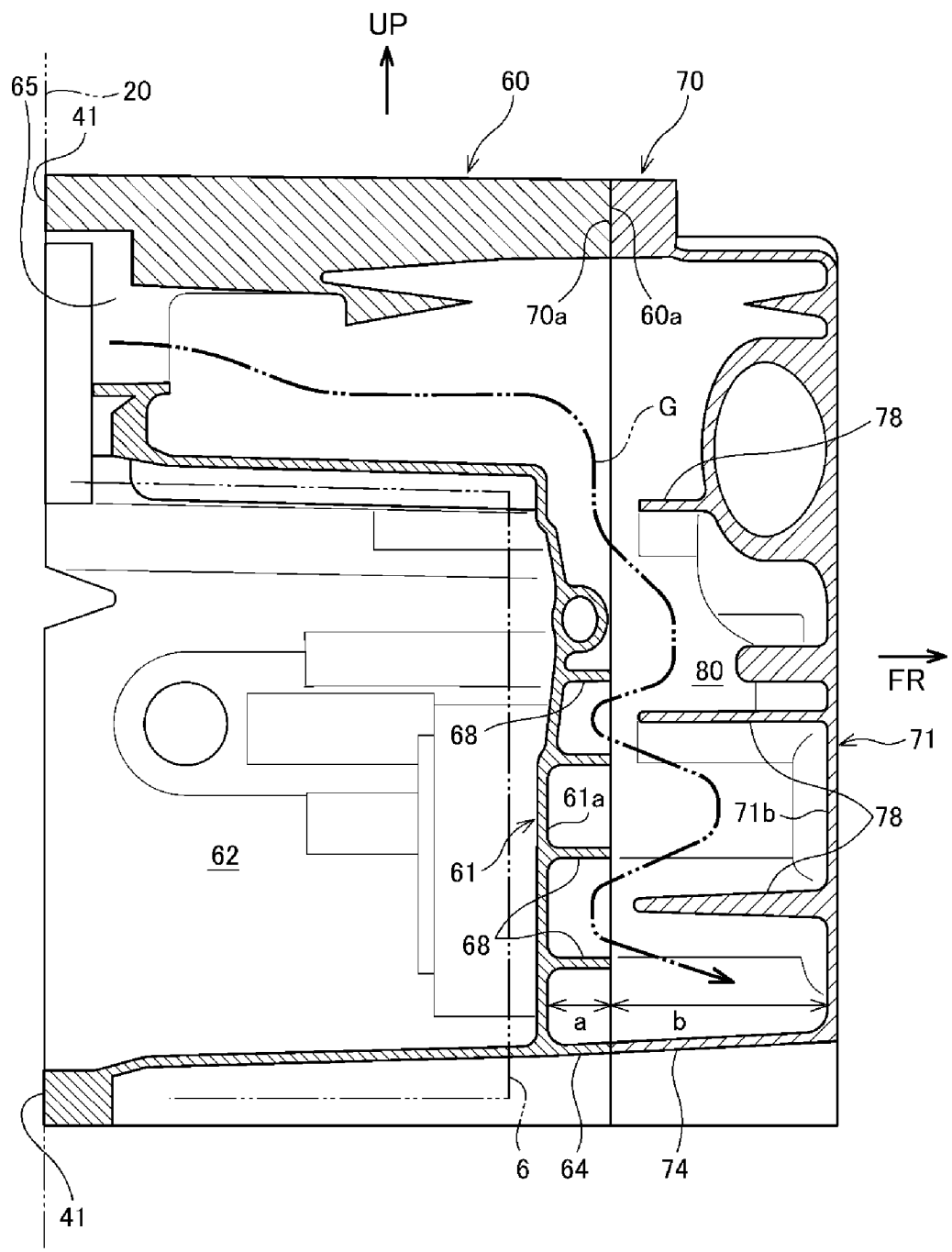
FIG. 9 is a cross-sectional view of the breather chamber taken along line IX-IX in FIGS. 6, 7, and 8.

FIG. 9 is a cross-sectional view of a breather chamber 80 taken along line IX-IX in FIGS. 6, 7, and 8.

As illustrated in FIG. 9, the partition bottom 61 of the generator cover 60 has a predetermined crankshaft center direction distance a from the mating surface 60a, and the top wall 71 of the protective cover 70 has a predetermined crankshaft center direction distance b from the mating surface 70a.

Therefore, a predetermined space 80 surrounded by the outer peripheral walls 64 and 74 is formed between the partition bottom 61 of the generator cover 60 and the top wall 71 of the protective cover 70.

In the present embodiment, the space 80 is a breather chamber 80 that separates a blow-by gas G generated in the crankcase 20 from the engine oil to be returned to the air cleaner box 30.

FIG. 6 illustrates a front surface of the generator cover 60 as viewed in the crankshaft direction, that is, a surface on the breather chamber 80 side, taken along line VI-VI in FIGS. 4 and 5. FIG. 8 illustrates a rear surface of the protective cover 70 as viewed in the crankshaft direction, that is, a surface on the breather chamber 80 side, taken along line VIII-VIII in FIGS. 4 and 5.

As illustrated in FIGS. 6 and 8, the breather chamber 80 is formed so as to surround the axis X of the crankshaft 21, and a connecting port 65 is provided in the upper portion of the generator cover 60 to communicate the internal space of the crankcase 20 with the breather chamber 80 and allow the blow-by gas G generated in the crankcase 20 to pass therethrough and flow into the breather chamber 80.

A discharge port 66 for returning the blow-by gas G to the air cleaner box 30 is provided in the upper portion of the generator cover 60, and an isolation rib 67 erected on the partition bottom 61 and having a height reaching the mating surface 60a is provided between the connecting port 65 and the discharge port 66, and is separated from the connecting port 65.

As illustrated in FIG. 6, a front surface 61a of the partition bottom 61 of the generator cover 60, that is, a surface on the breather chamber 80 side is provided with a crankshaft center opening peripheral wall 63a having a height that surrounds the crankshaft center opening 63 and reaches the mating surface 60a, and in addition to the isolation rib 67, a plurality of ribs 68 are radially provided from the crankshaft center opening peripheral wall 63a to the generator cover outer peripheral wall 64 at a height that reaches the mating surface 60a.

A reference sign 97b in FIG. 6 and a reference sign 97c in FIGS. 7 and 8 denote compressor drive shaft insertion holes through which the compressor drive shaft 97 of the air conditioner compressor device 95 is inserted.

As illustrated in FIG. 8, on a rear surface 71b of the top wall 71 of the protective cover 70, that is, on the surface on the breather chamber 80 side, a crankshaft center opening peripheral wall 73a having a height that surrounds the crankshaft center opening 73 and reaches the mating surface 70a is provided, and at a position that coincides with the isolation rib 67 when the protective cover 70 is attached to the generator cover 60, the isolation rib 77 is provided at a height that reaches the mating surface 70a from the crankshaft center opening peripheral wall 73a to the protective cover outer peripheral wall 74.

On the rear surface 71b of the top wall 71 of the protective cover 70, in addition to the isolation rib 77, a plurality of ribs 78 are radially provided from the crankshaft center opening peripheral wall 73a to the protective cover outer peripheral wall 74 at a height that does not reach the mating surface 70a.

In a state where the protective cover 70 is attached to the generator cover 60 to define the breather chamber 80, the blow-by gas G flowing into the breather chamber 80 from the connecting port 65 cannot directly flow toward the discharge port 66 since the breather chamber 80 is partitioned by the isolation ribs 67 and 77 butted against each other by the mating surfaces 60a and 70a.

As schematically indicated by two-dot chain line arrows in FIGS. 6 and 8, the blow-by gas G passes through the lower portion of the breather chamber 80 below the axis X of the crankshaft 21 while avoiding the crankshaft center opening peripheral walls 63a and 73a, and then turns upward to return to the air cleaner box 30 from the discharge port 66 opened to the upper portion of the breather chamber 80.

The discharge port 66 is provided with a breather joint 81 to which a breather hose 82 is connected, and the breather hose 82 is connected to the air cleaner box 30.

The blow-by gas G flows into the connecting port 65 in the upper portion of the generator cover 60 attached to the crankcase 20 from the internal space of the crankcase 20, but cannot directly flow toward the discharge port 66 as described above. After the blow-by gas passes through the lower portion of the breather chamber 80 below the axis X of the crankshaft 21, the blow-by gas G flows toward the discharge port 66 opened to the upper portion of the breather chamber 80.

As illustrated in FIG. 9, in this case, the blow-by gas G alternately passes over the plurality of ribs 68 on the front surface 61a of the partition bottom 61 of the generator cover 60 and the plurality of ribs 78 on the rear surface 71b of the top wall 71 of the protective cover 70, thereby, the breather chamber 80 has a labyrinth structure. Since the rib 78 on the protective cover 70 side is formed at a height that does not reach the mating surface 70a, the rib does not interfere with the rib 68 of the generator cover 60 and does not hinder the flow of the blow-by gas G.

When the blow-by gas G passes through the labyrinth structure in the breather chamber 80 from the connecting port 65, gas-liquid separation of the contained engine oil is promoted, and the engine oil drops below the breather chamber 80, and an oil return port 69 (see FIG. 6) is formed in a lower portion of the generator cover 60.

The oil return port 69 communicates with the oil pan 27 (see FIG. 4) disposed below the crankcase 20, and the engine oil in the liquefied blow-by gas G is easily returned to the oil pan 27 from the oil return port 69.

Figure 10:
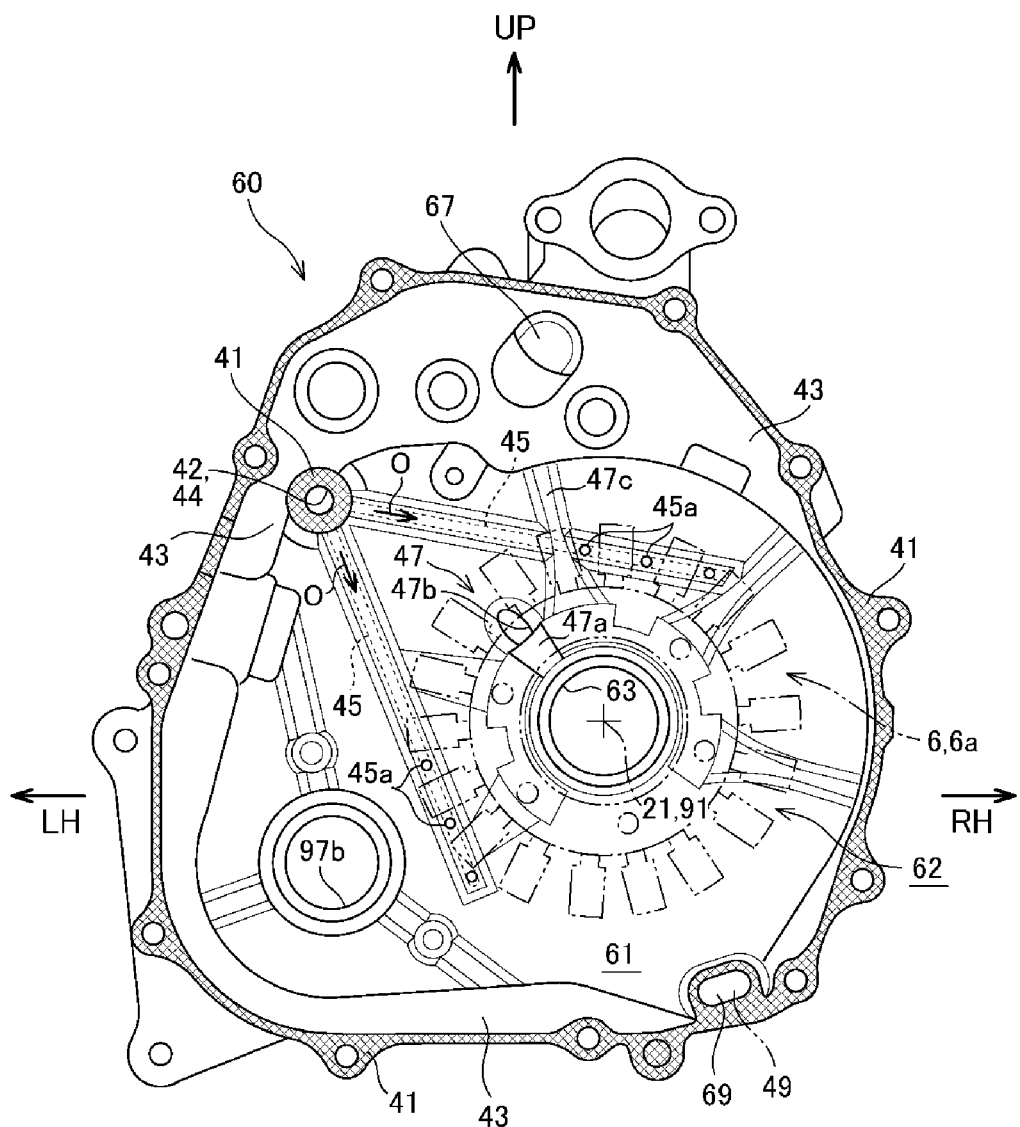
FIG. 10 is a rear view of the generator cover as viewed in the crankshaft direction, taken along line X-X in FIGS. 4 and 5, and illustrates a surface on the generator housing space side.

FIG. 10 is a rear view of the generator cover 60 as viewed in the crankshaft direction, taken along line X-X in FIGS. 4 and 5, and illustrates a surface on the generator housing space 62 side.

In FIG. 10, an arrow O schematically indicates the flow of the engine oil according to the present invention.

As illustrated in FIG. 4, in the crankcase 20 of the present embodiment, a main gallery 40 serving as a main oil passageway of engine oil supplied from an oil pump (not illustrated) for cooling and lubricating a main part of the internal combustion engine 2 is provided in parallel with the axis X of the crankshaft 21.

As illustrated in FIG. 10, on the crankcase contact surface 41 of the generator cover 60, a main gallery connecting port 42 that is connected to and communicates with the main gallery 40 in a state where the generator cover 60 is attached to the crankcase 20 is provided in the upper left portion (upper left in FIG. 10) of the generator cover 60 in the present embodiment.

The generator cover 60 includes a crankcase-side outer peripheral wall 43 formed around the generator housing space 62 is provided, and the crankcase contact surface 41 is attached to the crankcase 20 in contact therewith.

The crankcase-side outer peripheral wall 43 is provided with an outer peripheral wall oil passageway ("oil passageway" in the present invention) 44 communicating from the main gallery connecting port 42 and reaching the inside of the partition bottom 61 (see FIG. 4), and communicates with partition bottom oil passageways ("oil passageways" in the present invention) 45 provided inside a wall at a position facing the upper portion and the left portion of the generator 6 of the partition bottom 61.

The partition bottom oil passageway 45 is provided with a plurality of oil nozzles 45a penetrating the wall body of the partition bottom 61 and directed toward the inner stator 6b of the generator 6, and the engine oil sent from the main gallery 40 through the outer peripheral wall oil passageway 44 and the partition bottom oil passageway 45 is supplied for cooling the generator 6 and is mainly injected toward the inner stator 6b. The inner stator 6b is provided with an electromagnetic coil, which is cooled by the engine oil, and the cooling of the entire generator 6 is promoted.

The engine oil may be supplied to the generator 6 by directly piping the partition bottom oil passageway from an attachment portion 46 of the inner stator 6b toward the inner stator 6b.

The periphery of the inner stator 6b is surrounded by the outer rotor 6a fixed to the crankshaft 21 and rotating together with the crankshaft 21, and the engine oil that has cooled the inner stator 6b drops or scatters and comes into contact with the outer rotor 6a, or is scattered in the radial direction by the action of the centrifugal force or by the rotating airflow around the inner stator 6b, and adheres to the inner surface of the generator housing space 62 of the generator cover 60 and is collected.

On the partition bottom 61 on the generator housing space 62 side, a generator cover-side guide portion 47 including an oil receiving portion 47a that receives the engine oil attached to and dripping from the inner surface of the generator housing space 62 is provided above the axis X of the crankshaft 21. The oil receiving portion 47a slightly protrudes into the generator housing space 62 for receiving the engine oil.

The generator cover-side guide portion 47 includes an oil outlet portion 47b that extends to the opposite side from the oil receiving portion 47a and protrudes toward the protective cover 70 to open in order to allow collected engine oil to flow out to the protective cover 70 side.

The engine oil adhering to the inner surface below the oil receiving portion 47a drops and flows downward, and returns to the oil pan 27 from the generator housing space oil return port 49 provided in the lower portion of the generator housing space 62 and communicating with the oil pan 27.

The above-described oil return port 69 from the breather chamber 80 and the generator housing space oil return port 49 may be provided separately, or may be joined in the middle.

As illustrated in FIG. 5, the protective cover 70 is provided with a protective cover-side guide portion 48 at a position corresponding to the oil outlet portion 47b of the generator cover-side guide portion 47, and the protective cover-side guide portion 48 guides and supplies the engine oil flowing out from the generator cover-side guide portion 47 to the drive shaft 91 of the water pump 90 concentrically connected to the crankshaft 21.

That is, the drive shaft 91 of the water pump 90 is inserted into the drive shaft boss 92 extended into the crankshaft center opening 73 of the protective cover 70, and an oil passageway notch ("engine oil supply portion" in the present invention) 94a is formed at the end of the drive shaft boss 92 on the generator 6 side, and an oil passageway slit 94b in the axial direction is formed between the drive shaft boss 92 and the drive shaft 91 on the inner surface of the drive shaft boss.

The protective cover-side guide portion 48 is located in the vicinity of the upper portion of the drive shaft 91 of the water pump 90, and guides and drips the engine oil from the generator cover-side guide portion 47 to the oil passageway notch 94a at the end of the drive shaft boss 92. The engine oil passes through the oil passageway slit 94b from the oil passageway notch 94a and reaches the oil seal 93 of the water pump to perform lubrication. The engine oil after lubrication or excess engine oil returns from the oil return port 69 to the oil pan 27.

The partition bottom 61 of the generator cover 60 on the generator housing space 62 side is provided with a radial guide rib 47c extending upward from the generator cover-side guide portion 47, and the engine oil adhering to and collected by the centrifugal force on the inner surface of the generator housing space 62 of the generator cover 60 is actively guided to the generator cover-side guide portion 47 by the guide rib 47c.

The engine oil supply portion to the drive shaft 91 of the water pump 90 is in the crankshaft center opening 73 surrounded by the breather chamber 80 defined between the generator cover 60 and the protective cover 70, and the engine oil flowing out of the water pump 90 passes through a drain hole 73b provided in the lower portion of the crankshaft center opening peripheral wall 73a from the crankshaft center opening 73, flows down in the breather chamber 80, passes through the oil return port 69 provided in the lower portion of the breather chamber 80, and returns to the oil pan 27.

In the present embodiment, as described above, in the internal combustion engine 2 in which the crankshaft 21 is supported by the crankcase 20 of the internal combustion engine 2 and the generator cover 60 covering the generator 6 that generates power by the rotation of the crankshaft 21 is fixed to the crankcase, the protective cover 70 separate from the generator cover 60 is fixed to the generator cover 60. A predetermined space 80 is formed between the generator cover 60 and the protective cover 70, and the space is formed as a breather chamber 80 and communicates with the internal space of the crankcase 20 and the air cleaner box 30.

Since the breather chamber 80 is formed compactly by the generator cover 60 and the protective cover 70 as described above, it is possible to increase the capacity of the breather chamber 80 while avoiding enlargement of the internal combustion engine 2, and to improve the performance of the breather.

The generator 6 is provided on the front end 21a side of the crankshaft 21, and the generator cover 60 and the protective cover 70 are disposed so as to overlap with the outside of the crankcase 20 on the front end 21a side of the crankshaft 21 as viewed in the crankshaft direction.

Therefore, the breather chamber 80 can be formed compactly in the front portion of the generator cover 60, and the internal combustion engine 2 can be prevented from being enlarged. Further, since the breather chamber 80 is positioned with respect to the crankcase 20 with the generator housing space 62 of the generator cover 60 interposed therebetween, the temperature rise of the breather chamber 80 is suppressed, and the gas-liquid separation of the blow-by gas G is improved.

The breather chamber 80 is formed so as to surround the axis X of the crankshaft 21, and is configured such that the blow-by gas G generated in the crankcase 20 passes through a connecting port 65 provided in the generator cover 60 so as to communicate the internal space of the crankcase 20 with the breather chamber 80, flows into the breather chamber 80, passes through the lower portion of the breather chamber 80 below the axis X of the crankshaft 21, and then returns to the air cleaner box 30 from a discharge port 66 opened to an upper portion of the breather chamber 80 without any trouble.

As described above, since the blow-by gas G is discharged from the upper portion of the breather chamber 80 after flowing toward the lower portion of the breather chamber, the blow-by gas can be returned to the air cleaner box 30 even when the internal combustion engine 2 is largely inclined during traveling on an uneven ground. Since the breather chamber 80 is formed so as to surround the axis X of the crankshaft 21, the capacity of the breather chamber 80 can be increased, and the performance of the breather can be further improved.

Since the labyrinth structure is formed in the breather chamber 80 by the generator cover 60 and the protective cover 70, the labyrinth structure can be easily formed in the breather chamber 80, and since the inside of the breather chamber 80 has the labyrinth structure, the gas-liquid separation of the blow-by gas G can be smoothly performed.

The oil return port 69 for returning the engine oil in the liquefied blow-by gas G to the oil pan 27 disposed below the crankcase 20 is formed in a lower portion of the generator cover 60.

Therefore, when the blow-by gas G flowing into the breather chamber 80 flows downward, the liquefied engine oil flows down and easily returns from the oil return port 69 to the oil pan 27, so that the volume of the blow-by gas G returning to the air cleaner box 30 can be reduced, and the performance of the breather can be improved.

Further, since the water pump 90 is provided coaxially on the tip side of the crankshaft 21 and the water pump 90 is disposed outside the protective cover 70, the water pump 90 is positioned to protect the breather chamber 80, and the protection of the breather chamber 80 is improved.

In addition, since the oil passageway structure for internal combustion engines in the present embodiment is configured as described above, the oil passageway structure has the following features.

That is, in the internal combustion engine 2 in which the crankshaft 21 is supported by the crankcase 20 of the internal combustion engine 2 and the generator cover 60 covering the generator 6 that generates power by the rotation of the crankshaft 21 is fixed to the crankcase, the protective cover 70 that is separate from the generator cover 60 and is fixed to the outside of the generator cover 60 so as to overlap the generator cover 60 as viewed in the crankshaft direction is provided, and the water pump 90 is attached to the outer surface of the protective cover 70.

The drive shaft 91 of the water pump 90 is coaxially connected to the front end 21a of the crankshaft 21, and the generator cover 60 includes the outer peripheral wall oil passageway 44 and the partition bottom oil passageway 45 serving as oil passageways for supplying the engine oil from the crankcase 20 to the generator 6.

In addition, the generator cover 60 includes the generator cover-side guide portion 47 that causes the engine oil collected from the generator housing space 62 on the side housing the generator 6 to flow out to the side of the protective cover 70, and the protective cover 70 includes the protective cover-side guide portion 48 that guides and supplies the engine oil flowing out from the generator cover-side guide portion 47 to the drive shaft 91 of the water pump 90.

In a case where the engine oil is supplied from the crankcase 20 to the generator 6 and the water pump 90, there is a risk of an increase in the oil supply amount as the engine oil is branched and supplied. However, according to the present configuration, after the engine oil is supplied to the generator 6 without branching the engine oil, the engine oil is collected and supplied to the drive shaft 91 of the water pump 90, so that the engine oil supply amount can be suppressed.

In addition, since the engine oil can be supplied to the generator 6 prior to the water pump 90 to cool the generator 6, the cooling of the generator 6 can be improved, an amount of power generated by the generator 6 can increase, and the oil seal 93 of the drive shaft 91 of the water pump 90 can be lubricated without any problem.

In particular, in a case where an air conditioner is provided as in the vehicle of the present embodiment, the demand for the power generation amount is increased by the air conditioner device, and it is easy to cope with such a case.

The generator cover-side guide portion 47 includes the oil receiving portion 47a that receives the engine oil adhering to the inner surface of the generator cover 60 on the generator housing space 62 side above the axis X of the crankshaft 21, and the oil outlet portion 47b that extends from the oil receiving portion 47a toward the protective cover 70 and opens.

Since the generator 6 includes the outer rotor 6a that rotates together with the crankshaft 21, the engine oil supplied to the generator 6 and cooling the generator 6 can be collected on the inner surface of the generator cover 60 by centrifugal force.

The collected engine oil drops into the oil receiving portion 47a of the generator cover-side guide portion 47, is led out from the oil outlet portion 47b to the outside of the generator cover 60, and can be guided and supplied to the drive shaft 91 of the water pump 90 by the protective cover-side guide portion 48.

Therefore, the supply of the engine oil to the water pump 90 can be secured, and the engine oil is less likely to be accumulated in the generator housing space 62 of the generator cover 60.

The radial guide rib 47c extending upward from the generator cover-side guide portion 47 is provided on the inner surface of the generator housing space 62 of the generator cover 60.

Therefore, the engine oil adhering to and collected on the inner surface of the generator housing space 62 of the generator cover 60 by the centrifugal force can be actively guided to the generator cover-side guide portion 47 by the guide rib 47c, and the supply of the engine oil to the water pump 90 can be more reliably performed.

The engine oil supply portion to the drive shaft 91 of the water pump 90 is surrounded by the breather chamber 80 defined between the generator cover 60 and the protective cover 70, and the engine oil flowing out of the water pump 90 passes through the breather chamber 80, passes through the oil return port 69 provided in the lower portion of the breather chamber 80, and returns to the oil pan 27 of the internal combustion engine 2.

Therefore, the engine oil liquefied in the breather chamber 80 from the blow-by gas generated in the crankcase 20 and the engine oil supplied to the drive shaft 91 of the water pump 90, then flowed out from the water pump 90, and flowed down in the breather chamber 80 through the drain hole 73b can be collected and returned to the oil pan 27 through the oil return port 69, so that the engine oil can be efficiently circulated.

Further, the engine oil supplied to the water pump 90 comes into contact with the blow-by gas in the breather chamber 80 to promote gas-liquid separation of the blow-by gas.

Although one embodiment of the present invention has been described above, the aspect of the present invention is not limited thereto, and may be various aspects included in the gist of each claim of the claims. For example, the internal combustion engine is not limited to the two-cylinder internal combustion engine of the embodiment, and the left, right, front, and rear are described according to the illustration for convenience of description. However, for example, the internal combustion engine may be disposed to be horizontally reversed, and the generator and the generator cover may be provided not on the front end side but on the rear end side of the crankshaft.

REFERENCE SIGNS LIST 1 vehicle traveling on uneven ground
2 Internal combustion engine
5 output shaft
6 generator
6a outer rotor
6b inner stator
10 vehicle body frame 11 front wheel
12 rear wheel
20 crankcase
21 crankshaft
21a front end ("one end" in the present invention)
21b connection member
21d bolt
27 oil pan
30 air cleaner box
40 main gallery
41 crankcase contact surface
42 main gallery connecting port
43 crankcase-side outer peripheral wall
44 outer peripheral wall oil passageway ("oil passageway" in the present invention)
45 partition bottom oil passageway ("oil passageway" in the present invention)
45a oil nozzle
46 attachment portion
47 generator cover-side guide portion
47a oil receiving portion
47b oil outlet portion
47c guide rib
48 protective cover-side guide portion
49 generator housing space oil return port
60 generator cover
60a mating surface
61 partition bottom
61a front surface
62 generator housing space
63 crankshaft center opening
63a crankshaft center opening peripheral wall
64 outer peripheral wall of generator cover
65 connecting port
66 discharge port
69 oil return port
70 protective cover
70a mating surface
71 top wall
71b rear surface
73 crankshaft center opening
73a crankshaft center opening peripheral wall
73b drain hole
74 protective cover outer peripheral wall
80 space, breather chamber
90 water pump
91 drive shaft
92 drive shaft boss
93 oil seal
94a oil passageway notch ("engine oil supply portion" in the present invention)
94b oil passageway slit
P power unit
X axis (of crankshaft 21)
G blow-by gas
O flow of engine oil

The invention claimed is:

1. An oil passageway structure for internal combustion engines, the oil passageway structure being used for an internal combustion engine comprising:
a crankcase that supports a crankshaft;
a generator that is provided on one end side of the crankshaft and generates power by rotation of the crankshaft;
a generator cover that covers the generator and is fixed to the crankcase, and
a protective cover that is separate from the generator cover and is fixed to an outer side of the generator cover so as to overlap the generator cover as viewed in a crankshaft direction,
wherein a water pump is attached to an outer surface of the protective cover, and a drive shaft of the water pump is coaxially connected to one end of the crankshaft, and
the generator cover includes oil passageways through which engine oil is supplied from the crankcase and is supplied to the generator, and a generator cover-side guide portion through which the engine oil collected from a generator housing space on a side housing the generator flows out toward a protective cover side, and
the protective cover includes a protective cover-side guide portion that guides and supplies the engine oil flowing out of the generator cover-side guide portion to the drive shaft of the water pump.

2. The oil passageway structure for internal combustion engines according to claim 1, wherein the generator cover-side guide portion includes an oil receiving portion that receives the engine oil adhering to an inner surface of the generator cover on the generator housing space side above an axis of the crankshaft, and an oil outlet portion that extends from the oil receiving portion toward the protective cover and opens.

3. The oil passageway structure for internal combustion engines according to claim 2, wherein a radial guide rib extending upward from the generator cover-side guide portion is provided on an inner surface of the generator housing space of the generator cover.

4. The oil passageway structure for internal combustion engines according to claim 1, wherein an engine oil supply portion to the drive shaft of the water pump is surrounded by a breather chamber defined between the generator cover and the protective cover, and the engine oil flowing out from the water pump passes through the breather chamber, passes through an oil return port provided in a lower portion of the breather chamber, and returns to an oil pan of the internal combustion engine.

5. The oil passageway structure for internal combustion engines according to claim 2, wherein an engine oil supply portion to the drive shaft of the water pump is surrounded by a breather chamber defined between the generator cover and the protective cover, and the engine oil flowing out from the water pump passes through the breather chamber, passes through an oil return port provided in a lower portion of the breather chamber, and returns to an oil pan of the internal combustion engine.

6. The oil passageway structure for internal combustion engines according to claim 3, wherein an engine oil supply portion to the drive shaft of the water pump is surrounded by a breather chamber defined between the generator cover and the protective cover, and the engine oil flowing out from the water pump passes through the breather chamber, passes through an oil return port provided in a lower portion of the breather chamber, and returns to an oil pan of the internal combustion engine.

* * * * *